United States Patent
Chen et al.

(10) Patent No.: US 12,279,244 B2
(45) Date of Patent: Apr. 15, 2025

(54) WIRELESS COMMUNICATION APPARATUS FOR BEAM FAILURE RECOVERY

(71) Applicant: FUJITSU LIMITED, Kawasaki (JP)

(72) Inventors: Zhe Chen, Beijing (CN); Lei Zhang, Beijing (CN); Lei Song, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 318 days.

(21) Appl. No.: 17/702,148

(22) Filed: Mar. 23, 2022

(65) Prior Publication Data

US 2022/0217701 A1 Jul. 7, 2022

Related U.S. Application Data

(63) Continuation of application No. PCT/CN2019/109212, filed on Sep. 29, 2019.

(51) Int. Cl.
*H04W 72/044* (2023.01)
*H04W 72/56* (2023.01)

(52) U.S. Cl.
CPC ......... *H04W 72/046* (2013.01); *H04W 72/56* (2023.01)

(58) Field of Classification Search
None
See application file for complete search history.

(56) References Cited

U.S. PATENT DOCUMENTS

| | | | |
|---|---|---|---|
| 2019/0058519 A1* | 2/2019 | Davydov | H04W 72/21 |
| 2019/0081753 A1* | 3/2019 | Jung | H04L 1/1854 |
| 2019/0261280 A1 | 8/2019 | Jung et al. | |
| 2019/0306875 A1* | 10/2019 | Zhou | H04W 72/20 |
| 2019/0394082 A1* | 12/2019 | Cirik | H04W 76/28 |
| 2020/0154496 A1 | 5/2020 | Yi | |
| 2020/0389222 A1 | 12/2020 | Wu et al. | |
| 2021/0029724 A1* | 1/2021 | Tsai | H04W 72/569 |
| 2021/0050901 A1* | 2/2021 | Chin | H04W 72/56 |
| 2021/0058804 A1 | 2/2021 | Yang | |
| 2022/0095406 A1* | 3/2022 | Ahn | H04B 7/0626 |
| 2022/0210743 A1* | 6/2022 | Yi | H04L 1/1812 |
| 2022/0311498 A1* | 9/2022 | Loehr | H04B 7/088 |

FOREIGN PATENT DOCUMENTS

| | | |
|---|---|---|
| CN | 110035556 A | 7/2019 |
| JP | 2020-522955 A | 7/2020 |
| JP | 2020-533886 A | 11/2020 |
| WO | 2018/226065 A1 | 12/2018 |
| WO | 2018/230862 A1 | 12/2018 |

(Continued)

OTHER PUBLICATIONS

Chin—U.S. Appl. No. 62/886,776, filed Aug. 14, 2019 (Year: 2019).*

(Continued)

*Primary Examiner* — Andre Tacdiran
(74) *Attorney, Agent, or Firm* — Myers Wolin, LLC

(57) ABSTRACT

A wireless communication method and apparatus and a communication system. The wireless communication method includes: a terminal equipment receives an indication information set; and the terminal equipment determines a priority of a first uplink signal according to the indication information set, the first uplink signal being an uplink signal used for beam failure recovery.

11 Claims, 4 Drawing Sheets

(56) References Cited

FOREIGN PATENT DOCUMENTS

| WO | 2019/027294 A1 | 2/2019 |
|---|---|---|
| WO | 2019/033072 A1 | 2/2019 |
| WO | 2019/051487 A1 | 3/2019 |
| WO | 2019/154023 A1 | 8/2019 |
| WO | 2019/161132 A1 | 8/2019 |

OTHER PUBLICATIONS

Loehr—U.S. Appl. No. 62/906,576, filed Sep. 26, 2019 (Year: 2019).*
International Search Report and Written Opinion of the International Searching Authority issued by the China National Intellectual Property Administration for corresponding International Patent Application No. PCT/CN2019/109212, mailed on Jun. 30, 2020, with an English translation.
Vivo, "Discussion on the Service Based Channel Access Priority", Agenda Item: 11.2.1.2, 3GPP TSG-RAN WG2 Meeting #106, R2-1905624, revision of R2-1903080, Reno, USA, May 13-17, 2019.
Notice of Reasons for Refusal issued by the Japan Patent Office for corresponding Japanese Patent Application No. 2022-519075, mailed on May 16, 2023, with an English translation.
LG Electronics, "Discussion on beam failure recovery", Agenda Item: 7.2.2.4, 3GPP TSG-RAN WG1 Meeting #91, R1-1719908, Reno, USA, Nov. 27-Dec. 1, 2017.
Notice of Reasons for Refusal issued by the Japan Patent Office for corresponding Japanese Patent Application No. 2022-519075, mailed on Feb. 28, 2023, with an English translation.
The Extended European search report with supplementary European search report and the European search opinion issued by the European Patent office for corresponding European Patent Application No. 19946583.2-1215, dated Jul. 26, 2022.
Vivo, "RAN2 specification impacts of SCell BFR", Agenda Item: 11.6, 3GPP TSG-RAN WG2 Meeting #107, R2-1909781, Prague, Czech Republic; Aug. 26-30, 2019.
First Notification of Office Action and Search Report issued by the China National Intellectual Property Administration for corresponding Chinese Patent Application No. 201980100451.3, mailed on Jun. 16, 2023, with an English translation.
Examination Report issued by the Indian Patent Office for corresponding Indian Patent Application No. 202237016616, dated Aug. 1, 2022, with an English translation.
Communication pursuant to Article 94(3) EPC issued by the European Patent Office for corresponding European Patent Application No. 19946583.2, mailed on Nov. 19, 2024.
Notice of Preliminary Rejection issued by The Korean Intellectual Property Office for corresponding KR patent application No. 10-2022-7010388, mailed on Jan. 31, 2025, with an English translation.

* cited by examiner

WIRELESS COMMUNICATION APPARATUS FOR BEAM FAILURE RECOVERY

CROSS-REFERENCE TO RELATED APPLICATION

This application is a continuation application of International Patent Application PCT/CN2019/109212 filed on Sep. 29, 2019, the entire contents of which are incorporated herein by reference.

FIELD

This disclosure relates to the field of communications.

BACKGROUND

Currently, an NR (New Radio) system only supports initiating a beam failure recovery procedure on a primary cell (PCell) or a primary and secondary cell (PSCell). If a beam failure occurs on the secondary cell (SCell), the terminal equipment cannot notify the network device to make corresponding adjustments in time. However, since the SCell may carry a large amount of data services, the lack of beam failure resolution for SCell will cause a sharp drop in system performance. Therefore, it is necessary to introduce a mechanism for solving the SCell beam failure, that is, the SCell beam failure procedure.

In addition, the NR system will be further enhanced to enable simultaneous transmission of different types of services. In order to avoid conflicts between different services, a very important method is to indicate corresponding priorities to signals, that is, behaviors of a terminal equipment when two signals collide may be judged according to priorities to which corresponding signals correspond.

It should be noted that the above description of the background a is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in a process of SCell beam failure recovery, a terminal equipment may transmit corresponding information of the SCell beam failure to the network device by using an uplink signal. However, there is no corresponding mechanism to determine a priority of the uplink signal, which will result in that when resources of the uplink signal collides with resources of other uplink signals, whether the signal is able to be transmitted is unable to be determined, thereby resulting in low efficiency of the system.

In order to solve at least one of the above problems or other similar problems, embodiments of this disclosure provide a wireless communication method and apparatus and a communication system, so as to ensure flexibility of the system and transmission efficiency of the system.

According to a first aspect of the embodiments of this disclosure, there is provided a wireless communication method, the method including:
a terminal equipment receives an indication information set; and
the terminal equipment determines a priority of a first uplink signal according to the indication information set, the first uplink signal being an uplink signal used for beam failure recovery.

According to a second aspect of the embodiments of this disclosure, there is provided a wireless communication method, the method including:
a terminal equipment determines a priority of a first uplink signal according to a predefined priority, the first uplink signal being an uplink signal used for beam failure recovery.

According to a third aspect of the embodiments of this disclosure, there is provided a wireless communication apparatus, configured in a terminal equipment, the apparatus including:
a receiving unit configured to receive an indication information set; and
a determining unit configured to determine a priority of a first uplink signal according to the indication information set, the first uplink signal being an uplink signal used for beam failure recovery.

According to a fourth aspect of the embodiments of this disclosure, there is provided a wireless communication apparatus, configured in a terminal equipment, the apparatus including:
a determining unit configured to determine a priority of a first uplink signal according to a predefined priority, the first uplink signal being an uplink signal used for beam failure recovery.

According to a fifth aspect of the embodiments of this disclosure, there is provided a terminal equipment, including the apparatus as described in the third or the fourth aspect.

According to a sixth aspect of the embodiments of this disclosure, there is provided a communication system, including the terminal equipment as described in the fifth aspect and a network device.

According to another aspect of the embodiments of this disclosure, there is provided a computer readable program, which, when executed in a terminal equipment, will cause a computer to carry out the method described in the first or the second aspect in the terminal equipment.

According to a further aspect of the embodiments of this disclosure, there is provided a storage medium storing a computer readable program, which will cause a computer to carry out the method described in the first or the second aspect in a terminal equipment.

An advantage of the embodiments of this disclosure exists in that according to the embodiments of this disclosure, the priority of the uplink signal may be determined, and after the priority is determined, the terminal equipment may be assisted in making a determination: when the uplink signal collides with other signals, whether the uplink signal, or uplink signals with resources colliding with those of the uplink signal, or other uplink signals, is/are transmitted.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
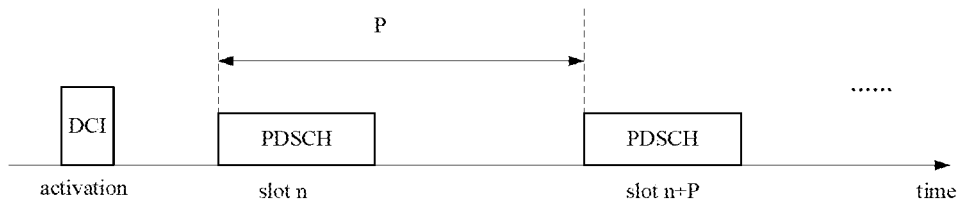
FIG. 1 is schematic diagram of semi-persistent scheduling.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (genescalen), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, an equipment accessing to a communication network and receiving network services via a network device, and may also be referred to as a "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In this embodiment of this disclosure, regarding an uplink signal used for beam failure recovery (BFR), such as a PUCCH for beam failure recovery, the terminal equipment performs beam failure detection on an SCell, such as performing beam failure detection according to a configured reference signal (RS) or a specific downlink signal (PDCCH). If a beam failure occurs in at least one of related SCells, the terminal equipment may transmit an uplink signal (PUCCH) on a PCell. A format of the uplink signal may be format 0 or format 1, and the uplink signal includes 1-bit information, which is used to notify the network device of whether BFR occurs in a related BFR SCell.

In the embodiments of this disclosure, regarding DL SPSs, one DL SPS generally corresponds to one SPS configuration, and downlink semi-persistent scheduling activation control information (DL SPS activation PDCCH) refers to control information for activating one SPS configuration set. For example, the SPS configuration set has a specific ID or has no specific ID, and the SPS configuration set includes one or more than one SPS configuration. Here, one SPS configuration being activated is taken as an example. As shown in FIG. 1, when a UE receives the activation PDCCH (DCI), the DCI and a corresponding SPS configuration may provide information for receiving a corresponding PDSCH (physical downlink shared channel). As shown in FIG. 1, according to the information, the UE receives a first PDSCH after activation (at a slot n). Thereafter, the UE may determine a receiving position of a second PDSCH according to a period in the SPS configuration (for example, the period is P), that is, a slot n+P, and receive subsequent PDSCHs, and so on. When the UE receives downlink semi-persistent scheduling release/deactivation control information (DL SPS release/deactivation PDCCH), it stops receiving a PDSCH to which a corresponding SPS configuration corresponds, or, in other words, clears corresponding downlink assignment and releases corresponding configurations. In addition, that an activation PDCCH (activation DCI) activates an SPS configuration set may be understood as that all SPS configurations in the SPS configuration set are activated or reactivated and conform to the above description of behaviors. That a release or deactivation PDCCH (release or deactivation DCI) releases or deactivates an SPS configuration set may be understood as that all SPS configurations in the SPS configuration set are deactivated or released (if corresponding SPS configurations are active) and conform to the above description of behaviors.

Figure 2:
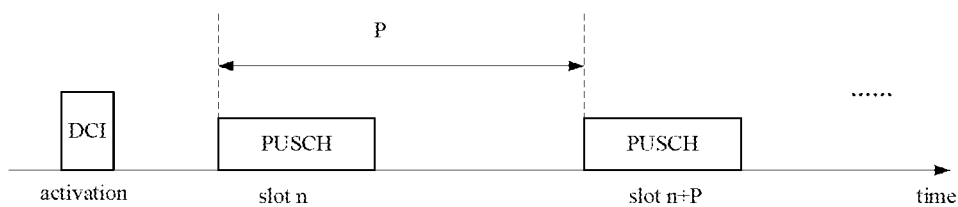
FIG. 2 is another schematic diagram of semi-persistent scheduling.

In the embodiments of this disclosure, regarding UL Grant Type 2, one UL Grant Type 2 uplink transmission generally corresponds to one CG configuration, and a UL Grant Type 2 activation PDCCH refers to control information used to activate a CG configuration set, for example, the CG configuration set has a specific ID or has no specific ID. The CG configuration set contains one or more than one CG configurations. Here, taking one of the CG configurations as an example, as shown in FIG. 2, when the UE receives the activation PDCCH (DCI), the DCI and a corresponding CG configuration may provide information for transmitting a corresponding PUSCH (physical uplink shared channel). As shown in FIG. 2, according to the information, the UE transmits a first PUSCH after activation (at a slot n). Thereafter, the UE may determine a transmitting position of a second PUSCH according to a period in the CG configuration (for example, the period is P), that is, a slot n+P, and transmit subsequent PUSCHs, and so on. When the UE receives the downlink semi-persistent scheduling release/deactivation control information (DL SPS release/deactivation PDCCH), it stops transmitting a PUSCH to which a corresponding CG configuration corresponds, or, in other words, clears corresponding UL grants and releases corresponding configurations. In addition, that an activation PDCCH (activation DCI) activates a CG configuration se may be understood as that all CG configurations in the CG configuration set are activated or reactivated and conform to the above description of behaviors. That a release or deactivation PDCCH (release or deactivation DCI) releases or deactivates an CG configuration set may be understood as that all CG configurations in the CG configuration set are released or deactivated (if corresponding CG configurations are active) and conform to the above description of behaviors.

In FIGS. 1 and 2 and corresponding description, a slot is taken as a time unit; however, this disclosure is not limited thereto, and a time unit involved in this disclosure may also be a symbol, a sub-slot, or a frame, or a sub-frame, etc.

Various implementations of the embodiments of this disclosure shall be described below with reference to the accompanying drawings. These implementations are illustrative only, and are not intended to limit this disclosure.

Embodiment of the First Aspect

Figure 3:
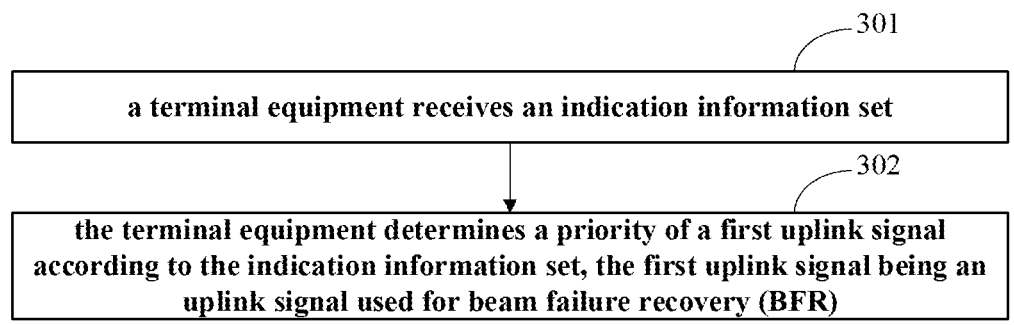
FIG. 3 is a schematic diagram of the wireless communication method of the first aspect of the embodiments of this disclosure.

The embodiment of the first aspect of this disclosure provides a wireless communication method, applicable to a terminal equipment. FIG. 3 is a schematic diagram of the wireless communication method of the embodiment of this disclosure. Referring to FIG. 3, the method includes:
  operation 301: a terminal equipment receives an indication information set; and
  operation 301: the terminal equipment determines a priority of a first uplink signal according to the indication information set, the first uplink signal being an uplink signal used for beam failure recovery (BFR).

Currently, there is no mechanism for indicating a priority of an uplink signal related to a BFR procedure. The priority of the uplink signal being determined according to the method of the embodiment of this disclosure may better solve a problem of signal conflict, so that the system is able to deal with a transmission relationship between the uplink signal and other uplink signals, thereby improving the efficiency of the system.

In the embodiment of this disclosure, the above beam failure recovery may refer to beam failure recovery related to an SCell, and may also refer to beam failure recovery related to an SpCell; however, this disclosure is not limited thereto.

In the embodiment of this disclosure, the above first uplink signal may be a PUCCH (physical uplink control channel), and a format of the PUCCH may be format 0 or format 1 or other formats. In addition, the above first uplink signal may also be a PUSCH (physical uplink shared channel) or a PRACH (physical random access channel), and this disclosure is not limited thereto.

In the embodiment of this disclosure, the indication information in the above indication information set may act on at least one cell corresponding to the above first uplink signal, and here, the cell corresponding to the above first uplink signal may be a cell corresponding to a BFR configuration or process to which the above first uplink signal corresponds. For example, the cell may be an SCell or a SpCell, and the cell may belong to the same cell group as the above first uplink signal, and this disclosure is not limited thereto. Since the above first uplink signal is associated with the above cell, the indication information acting on the above cell may help the terminal equipment to determine the priority of the first uplink signal. In addition, it may also be understood that if the indication information does not act on the cell, it is irrelevant to the priority of the first uplink signal. Thus, the terminal equipment may determine the priority of the first uplink signal according to associated indication information.

In the embodiment of this disclosure, the indication information in the above indication information set may act on an activated bandwidth part (BWP). As the above first uplink signal is associated with the above BWP, the indication information acting on the above BWP may help the terminal equipment to determine the priority of the first uplink signal. In addition, it may also be understood that if the indication information does not act on the above BWP, it is irrelevant to the priority of the first uplink signal. Thus, the terminal equipment may determine the priority of the first uplink signal according to associated indication information.

In an embodiment, the above indication information set includes at least first indication information, the first indication information being used to indicate the priority of the above first uplink signal. Thus, the terminal equipment may directly determine the priority of the first uplink signal according to the first indication information. In this example, the first indication information may be RRC signaling; however, this disclosure is not limited thereto.

In another embodiment, the above indication information set at least includes second indication information, the second indication information being used to indicate a priority of a BFR procedure and/or configuration to which the first uplink signal corresponds. Thus, the terminal equipment may indirectly determine the priority of the first uplink signal according to the second indication information. In this example, the second indication information may be RRC signaling; however, this disclosure is not limited thereto.

In a further embodiment, the above indication information set at least includes third indication information, the third indication information being used to indicate or determine at least one of the following three items: a priority to which activated SPS PDSCH reception corresponds; a priority to which activated CG PUSCH transmission corresponds; and a priority associated with downlink control information (DCI). Thus, the terminal equipment may indirectly determine the priority of the first uplink signal according to the third indication information. For example, the terminal equipment may determine the priority of the first uplink signal according to a highest priority in priorities to which the third indication information corresponds.

In the embodiment of this disclosure, the priority to which the activated SPS PDSCH reception corresponds refers to a priority corresponding to an SPS configuration to which the activated SPS PDSCH reception corresponds. Here, the SPS PDSCH reception refers to that the terminal equipment monitors or receives a corresponding PDSCH according to SPS activation DCI and corresponding SPS configuration information (at an active BWP in a corresponding serving cell). Here, the SPS activation DCI (i.e. DCI used for activating the SPS) refers to, with respect to a corresponding SPS configuration, SPS activation DCI most close (to its corresponding SPS PDSCH reception) in the time domain, that is, there exists no other SPS active DCI (belonging to the same SPS configuration) between the SPS activation DCI and its corresponding SPS PDSCH reception.

In at least one embodiment, if there exists an activated DL SPS, the terminal equipment may determine the priority of the first uplink signal at least according to a priority to which the activated SPS PDSCH reception corresponds. For example, if a corresponding priority is configured or is indicated via the activation DCI, the priority of the first uplink signal may be determined according to the configuration or the indication. For another example, if a corresponding priority is not configured or is not indicated via the activation DCI, the priority of the first uplink signal may be determined according to a default or predefined priority.

In the embodiment of this disclosure, the priority to which activated CG PUSCH transmission corresponds refers to a priority corresponding to a CG configuration to which the activated CG PUSCH transmission corresponds. The CG PUSCH transmission refers to that the terminal equipment transmits a corresponding PUSCH according to the CG activation DCI and corresponding CG configuration information (at an active BWP in a corresponding serving cell). Here, the CG activation DCI (that is, DCI used for activating a CG) refers to, with respect to a corresponding CG configuration, CG activation DCI most close (to its corresponding CG PUSCH transmission) in the time domain, that is, there exists no other CG activation DCI (belonging to the same CG configuration) between the CG activation DCI and its corresponding CG PUSCH transmission.

In at least one embodiment, if there exists an activated UL CG, the terminal equipment may determine the priority of the first uplink signal at least according to a priority to which the activated CG PUSCH transmission corresponds. For example, if a corresponding priority is configured or is indicated via the activation DCI, the priority of the first uplink signal may be determined according to the configuration or the indication. For another example, if a corresponding priority is not configured or is not indicated via the activation DCI, the priority of the first uplink signal may be determined according to a default or predefined priority.

In this embodiment of this disclosure, the priority associated with the above downlink control information (DCI) may be one of the following: a highest priority indicated (or is able to be indicated) by a field of the DCI used for indicating priorities, a highest priority to which a scrambling ID corresponds, the scrambling ID scrambling CRS to which the DCI corresponds, a highest priority to which a CORESET (control resource set) corresponds, an SS (search space) monitoring the DCI corresponding to the CORESET, and a priority to which a format of the DCI corresponds.

For example, the DCI includes a field for indicating a priority, and a size of the field is 1, then the DCI may indicate at most two priorities. Assuming that codepoint '0' corresponds to a first priority, codepoint '1' corresponds to a second priority, and the first priority is higher than the second priority, a highest priority associated with the DCI is (may also be referred to as a highest priority that the DCI is allowed to indicate, same as below) is the first priority.

For another example, CRC to which the DCI corresponds may be scrambled by two scrambling IDs, namely ID #1 and ID #2, then the DCI may indicate at most two priorities. Assuming that ID #1 corresponds to a first priority, ID #2 corresponds to a second priority, and the first priority is higher than the second priority, a highest priority associated with the DCI is the first priority.

For a further example, the DCI may be monitored by two SSs corresponding to different CORESETs, namely CORE- SET #1 and CORESET #2, then the DCI may indicate at most two priorities. Assuming that CORESET #1 corresponds to a first priority, CORESET #2 corresponds to a second priority, and the first priority is higher than the second priority, a highest priority associated with the DCI is the first priority.

For still another example, DCI formats 0_0/0_1/1_0/1_1 correspond to a first priority, DCI format A corresponds to a second priority, and the second priority is higher than the first priority, then a highest priority associated with the DCI is the second priority.

For yet another example, if the DCI may only indicate one priority, DCI formats 0_0/0_1/1_0/1_1 correspond to a first priority; and if DCI may only indicate one priority, DCI format A corresponds to a second priority, and the second priority is higher than the first priority, then a highest priority associated with the DCI is the second priority.

For yet still another example, if DCI may only indicate one priority, DCI formats 0_0/0_1/1_0/1_1 correspond to a first priority, DCI format A corresponds to a second priority, and the second priority is higher than the first priority, then a highest priority associated with the DCI is the second priority.

For a yet further example, if DCI formats 0_0/0_1/1_0/1_1 correspond to a first priority and the DCI may only indicate one priority, DCI format A corresponds to a second priority, and the second priority is higher than the first priority, then a highest priority associated with the DCI is the second priority.

In the above examples, that "the DCI may only indicate one priority" refers to that the DCI does not have a field for indicating a priority, or the DCI does not distinguish priorities by using the scrambling RNTI corresponding to the CRC, or the DCI does not distinguish priorities by using the CORESET corresponding to the corresponding search space (SS).

In the above examples, the "DCI format A" refers to at least one satisfying the following descriptions that:
- a length of an HPN (HARQ process number, hybrid automatic repeat request process number) field of the DCI format is configurable;
- a length of an RV (redundancy version) field of the DCI format is configurable; and
- a format of the DCI is DCI format 0_2, or a format of the DCI is DCI format 1_2.

In the embodiment of this disclosure, the above downlink control information refers to monitored downlink control information, such as monitored DCI, or monitored PDCCH, etc. Here, "monitored" may be monitored by a terminal equipment; however, this disclosure is not limited thereto.

In this embodiment of this disclosure, after the priority of the first uplink signal is determined, when resources used for transmitting the first uplink signal overlap with resources used for transmitting another uplink signal (referred to as a second uplink signal), transmission of the uplink signals may be performed according to the priority of the first uplink signal and a priority of the second uplink signal. Here, "overlap" refers to overall overlapping (in the time domain) or partial overlapping (in the time domain), and it may also be understood that at least one symbol or slot or sub-slot of the first uplink signal overlaps with at least one symbol or slot or sub-slot of the second uplink signal.

In at least one embodiment, if the resources used for transmitting the first uplink signal overlap with the resources used for transmitting the second uplink signal and the priority of the first uplink signal is higher than the priority of the second uplink signal, the terminal equipment may transmit the first uplink signal.

In at least one embodiment, if the resources used for transmitting the first uplink signal overlap with the resources used for transmitting the second uplink signal, and the priority of the first uplink signal is lower than the priority of the second uplink signal, the terminal equipment may transmit the second uplink signal.

In at least one embodiment, if the resources used for transmitting the first uplink signal overlap with the resources used for transmitting the second uplink signal and the priority of the first uplink signal is identical to the priority of the second uplink signal, the terminal equipment may transmit the first uplink signal.

In this embodiment, the second uplink signal may be, for example, a physical uplink control channel (PUCCH) at least carrying scheduling request (SR) information, or, a physical uplink control channel (PUCCH) at least carrying channel state information (CSI), or, a PUCCH at least carrying hybrid automatic repeat request feedback (HARQ-ACK) information, or, a physical uplink shared channel (PUSCH).

In at least one embodiment, if the resources used for transmitting the first uplink signal overlap with the resources used for transmitting the second uplink signal and the priority of the first uplink signal is identical to the priority of the second uplink signal, the terminal equipment may transmit the second uplink signal.

In this embodiment, the second uplink signal may be, for example, a PUSCH, and the PUSCH includes information carried by the first uplink signal.

In at least one embodiment, if the resources used for transmitting the first uplink signal overlap with the resources used for transmitting the second uplink signal and the priority of the first uplink signal is identical the priority of the second uplink signal, the terminal equipment may transmit the third uplink signal, wherein information carried by the third uplink signal includes the information carried by the first uplink signal and information carried by the second uplink signal.

In this example, the second uplink signal may be a PUCCH, the third uplink signal may be a PUCCH, and the second uplink signal may include an HARQ (hybrid automatic repeat request) and/or CSI (channel state information).

According to the method of the embodiment of this disclosure, the terminal equipment is able to process the uplink transmission of identical or different priorities, thereby avoiding ambiguities of behaviors and improving the system efficiency.

Embodiment of the Second Aspect

The embodiment of the second aspect of this disclosure provides a wireless communication method, applicable to a terminal equipment. What is different from the wireless communication method in the first aspect is that in the embodiment of this disclosure, the priority of the first uplink signal is predefined. Contents identical to those in the embodiment of the first aspect shall not be described herein any further.

Figure 4:
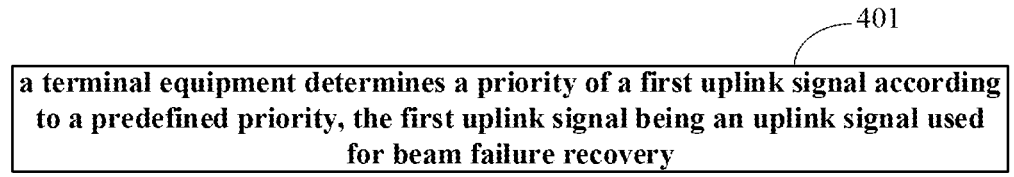
FIG. 4 is a schematic diagram of the wireless communication method of the second aspect of the embodiments of this disclosure.

FIG. 4 is a schematic diagram of the wireless communication method of the embodiment of this disclosure. As shown in FIG. 4, the method includes:
- operation 401: a terminal equipment determines a priority of a first uplink signal according to a predefined priority, the first uplink signal being an uplink signal used for beam failure recovery.

In the embodiment of this disclosure, the priority of the first uplink signal is not configured or indicated, but is predefined, that is, it is defined in advance, and may be learnt in advance by both a network device and the terminal equipment, such as a lowest or highest priority in the system. Therefore, a problem of signal conflict may be better resolved, so that the system is able to deal with a transmission relationship between the uplink signal and other uplink signals, thereby improving efficiency of the system.

In the embodiment of this disclosure, when resources used for transmitting the first uplink signal overlap with resources used for transmitting another uplink signal (referred to as a second uplink signal), the terminal equipment may perform the transmission of the uplink signals according to the priority of the first uplink signal and a priority of the second uplink signal. Here, "overlap" refers to overall overlapping (in the time domain) or partial overlapping (in the time domain), and it may also be understood that at least one symbol or slot or sub-slot of the first uplink signal overlaps with at least one symbol or slot or sub-slot of the second uplink signal.

In at least one embodiment, if the resources used for transmitting the first uplink signal overlap with the resources used for transmitting the second uplink signal and the priority of the first uplink signal is higher than the priority of the second uplink signal, the terminal equipment may transmit the first uplink signal.

In at least one embodiment, if the resources used for transmitting the first uplink signal overlap with the resources used for transmitting the second uplink signal, and the priority of the first uplink signal is lower than the priority of the second uplink signal, the terminal equipment may transmit the second uplink signal.

In at least one embodiment, if the resources used for transmitting the first uplink signal overlap with the resources used for transmitting the second uplink signal and the priority of the first uplink signal is identical to the priority of the second uplink signal, the terminal equipment may transmit the first uplink signal.

In this embodiment, the second uplink signal may be, for example, a physical uplink control channel (PUCCH) at least carrying scheduling request (SR) information, or, a physical uplink control channel (PUCCH) at least carrying channel state information (CSI), or, a PUCCH at least carrying hybrid automatic repeat request feedback (HARQ-ACK) information, or, a physical uplink shared channel (PUSCH).

In at least one embodiment, if the resources used for transmitting the first uplink signal overlap with the resources used for transmitting the second uplink signal and the priority of the first uplink signal is identical to the priority of the second uplink signal, the terminal equipment may transmit the second uplink signal.

In this embodiment, the second uplink signal may be, for example, a PUSCH, and the PUSCH includes information carried by the first uplink signal.

In at least one embodiment, if the resources used for transmitting the first uplink signal overlap with the resources used for transmitting the second uplink signal and the priority of the first uplink signal is identical the priority of the second uplink signal, the terminal equipment may transmit a third uplink signal, wherein information carried by the third uplink signal includes the information carried by the first uplink signal and information carried by the second uplink signal.

In this example, the second uplink signal may be a PUCCH, the third uplink signal may be a PUCCH, and the second uplink signal may include an HARQ (hybrid automatic repeat request) and/or CSI (channel state information).

According to the method of the embodiment of this disclosure, the terminal equipment is able to process the uplink transmission of identical or different priorities, thereby avoiding ambiguities of behaviors and improving the system efficiency.

Embodiment of the Third Aspect

The embodiment of the third aspect of this disclosure provides a wireless communication method, applicable to a network device. This method is processing at a network side corresponding to the method in the first aspect, with contents identical to those in the embodiment of the first aspect being not be described herein any further.

Figure 5:
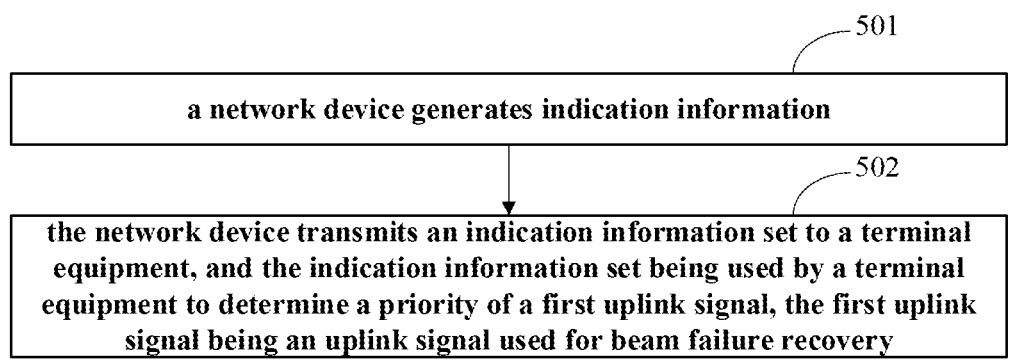
FIG. 5 is a schematic diagram of the wireless communication method of the third aspect of the embodiments of this disclosure.

FIG. 5 is a schematic diagram of the wireless communication method of the third aspect of the embodiments of this disclosure. As shown in FIG. 5, the method includes:

operation 501: a network device generates indication information; and operation 502: the network device transmits an indication information set to a terminal equipment, and the indication information set being used by a terminal equipment to determine a priority of a first uplink signal, the first uplink signal being an uplink signal used for beam failure recovery.

In the embodiment of this disclosure, contents of the indication information set and a manner for determining the priority of the first uplink signal by the terminal equipment have been described in detail in the embodiment of the first aspect, contents of which are incorporated herein, and shall not be described herein any further.

In the embodiment of this disclosure, the network device may further receive the first uplink signal, a second uplink signal and/or a third uplink signal, and manners for transmitting the first uplink signal, the second uplink signal and the third uplink signal have been described in detail in the embodiment of the first aspect, contents of which are incorporated herein, and shall not be described herein any further.

According to the method of the embodiment of this disclosure, as described in the embodiment of the first aspect, the terminal equipment is able to process the uplink transmission of identical or different priorities, thereby avoiding ambiguities of behaviors and improving the system efficiency.

Embodiment of the Fourth Aspect

The embodiment of the fourth aspect of this disclosure provides a wireless communication apparatus, configured in a terminal equipment. As principles of the apparatus for solving problems are similar to that of the method of the embodiment of the first aspect, reference may be made to the implementations of the method of the embodiment of the first aspect for implementations of this apparatus, with identical parts being not going to be described herein any further.

Figure 6:
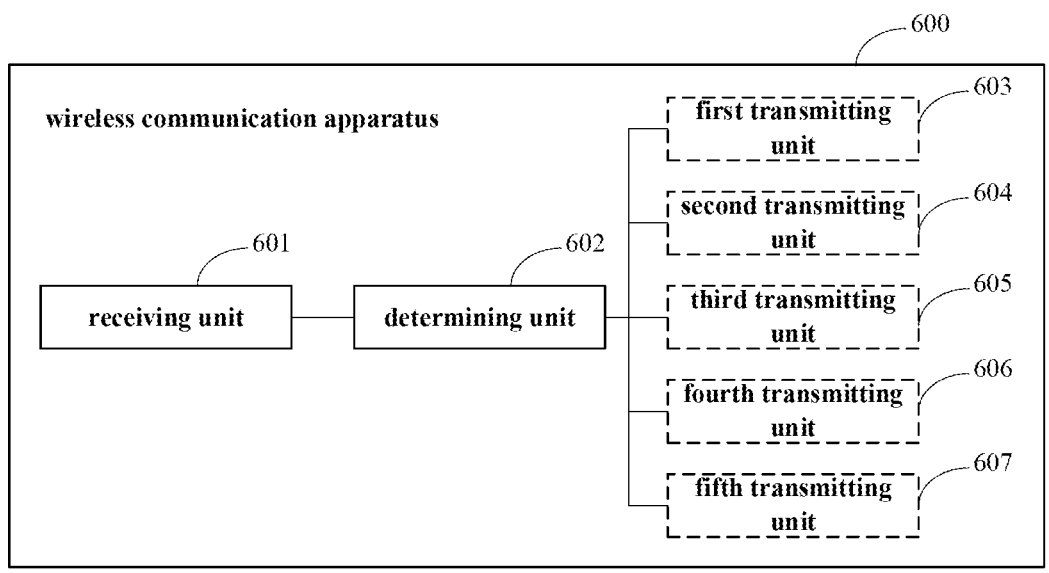
FIG. 6 is a schematic diagram of the wireless communication apparatus of the fourth aspect of the embodiments of this disclosure.

FIG. 6 is a schematic diagram of the wireless communication apparatus of this embodiment. As shown in FIG. 6, the apparatus 600 includes: a receiving unit 601 and a determining unit 602. The receiving unit 601 is configured to receive an indication information set, and the determining unit 602 is configured to determine a priority of a first uplink signal according to the indication information set, the first uplink signal being an uplink signal used for beam failure recovery.

In the embodiment of this disclosure, the first uplink signal is a PUCCH, or a PUSCH, or a physical random access channel (PRACH). A format of the PUCCH is, for example, format 0 or format 1.

In the embodiment of this disclosure, the indication information in the indication information set acts on at least one cell corresponding to the first uplink signal. The cell corresponding to the first uplink signal refers to a cell corresponding to a beam failure recovery (BFR) configuration or process to which the first uplink signal corresponds. The cell is, for example, an SCell or an SpCell. The cell and the first uplink signal may belong to the same cell group.

In the embodiment of this disclosure, the indication information in the indication information set may act on an activated bandwidth part (BWP).

In an embodiment, the above indication information set includes at least first indication information, the first indication information being used to indicate a priority of the first uplink signal, and the determining unit 602 determines the priority of the first uplink signal according to the first indication information.

In another embodiment, the indication information set includes at least second indication information, the second indication information being used to indicate a priority of a beam failure recovery (BFR) process and/or configuration to which the first uplink signal corresponds, and the determining unit 602 determines the priority of the first uplink signal according to the second indication information.

In a further embodiment, the indication information set at least includes third indication information, the third indication information being used to indicate or determine at least one of the following:
- a priority to which activated SPS PDSCH reception corresponds;
- a priority to which activated CG PUSCH transmission corresponds; and
- a priority associated with downlink control information (DCI);
- and the determining unit 602 determines the priority of the first uplink signal according to the third indication information.

In at least one embodiment, the determining unit 602 determines the priority of the first uplink signal according to a highest priority in priorities to which the third indication information corresponds.

In at least one embodiment, the priority to which the activated SPS PDSCH reception corresponds refers to a priority corresponding to an SPS configuration to which the activated SPS PDSCH reception corresponds.

In at least one embodiment, the priority to which activated CG PUSCH transmission corresponds refers to a priority corresponding to a CG configuration to which the activated CG PUSCH transmission corresponds.

In at least one embodiment, the priority associated with the downlink control information is one of the following:
- a highest priority indicated by a field of the downlink control information used for indicating priorities;
- a highest priority to which a scrambling ID corresponds, the scrambling ID scrambling CRS to which the downlink control information corresponds;
- a highest priority to which a control resource set (CORESET) corresponds, a search space monitoring the downlink control information corresponding to the CORESET; and
- a priority to which a format of the downlink control information (DCI format) corresponds.

In at least one embodiment, the downlink control information refers to monitored downlink control information (monitored DCI/PDCCH).

In the embodiment of this disclosure, in an example, as shown in FIG. 6, the apparatus 600 may further include:
- a first transmitting unit 601 configured to transmit the first uplink signal, a resource used for transmission of the first uplink signal overlapping a resource used for transmission of a second uplink signal, and the priority of the first uplink signal being higher than a priority of the second uplink signal.

In the embodiment of this disclosure, in an example, as shown in FIG. 6, the apparatus 600 may further include:
- a second transmitting unit 604 configured to transmit a second uplink signal, a resource used for transmission of the first uplink signal overlapping a resource used for transmission of the second uplink signal, and the priority of the first uplink signal being lower than a priority of the second uplink signal.

In the embodiment of this disclosure, in an example, as shown in FIG. 6, the apparatus 600 may further include:
- a third transmitting unit configured to transmit the first uplink signal, a resource used for transmission of the first uplink signal overlapping a resource used for transmission of the second uplink signal, and the priority of the first uplink signal being identical to a priority of the second uplink signal.

In this example, the second uplink signal is one of the following:
- a physical uplink control channel (PUCCH) at least carrying scheduling request (SR) information;
- a physical uplink control channel (PUCCH) at least carrying channel state information (CSI);
- a PUCCH at least carrying hybrid automatic repeat request feedback (HARQ-ACK) information; and
- a physical uplink shared channel (PUSCH).

In the embodiment of this disclosure, in an example, as shown in FIG. 6, the apparatus 600 may further include:
- a fourth transmitting unit 606 configured to transmit a second uplink signal, a resource used for transmission of the first uplink signal overlapping a resource used for transmission of the second uplink signal, and the priority of the first uplink signal being identical to a priority of the second uplink signal.

In this example, the second uplink signal is a PUSCH, and the second uplink signal includes information carried by the first uplink signal.

In the embodiment of this disclosure, in an example, as shown in FIG. 6, the apparatus 600 may further include:
- a fifth transmitting unit 607 configured to transmit a third uplink signal, information carried by the third uplink signal comprising information carried by the first uplink signal and information carried by a second uplink signal, a resource used for transmission of the first uplink signal overlapping a resource used for transmission of the second uplink signal, and the priority of the first uplink signal being identical to a priority of the second uplink signal.

In this example, the second uplink signal is a PUCCH, the third uplink signal is a PUCCH, and the second uplink signal includes a hybrid automatic repeat request (HARQ) and/or channel state information (CSI).

In the embodiment of this disclosure, the receiving unit 601 may be implemented by a receiver, the determining unit 602 may be implemented by a processor, and the first to the fifth transmitting units 603-607 may be implemented by transmitters; however, this disclosure is not limited thereto.

According to the apparatus of the embodiment of this disclosure, as described in the embodiment of the first aspect, the terminal equipment is able to process the uplink transmission of identical or different priorities, thereby avoiding ambiguities of behaviors and improving the system efficiency.

Embodiment of the Fifth Aspect

The embodiment of the fifth aspect of this disclosure provides a wireless communication apparatus, configured in a terminal equipment. As principles of the apparatus for solving problems are similar to that of the method of the embodiment of the second aspect, reference may be made to the implementations of the method of the embodiment of the second aspect for implementations of this apparatus, with identical parts being not going to be described herein any further.

Figure 7:
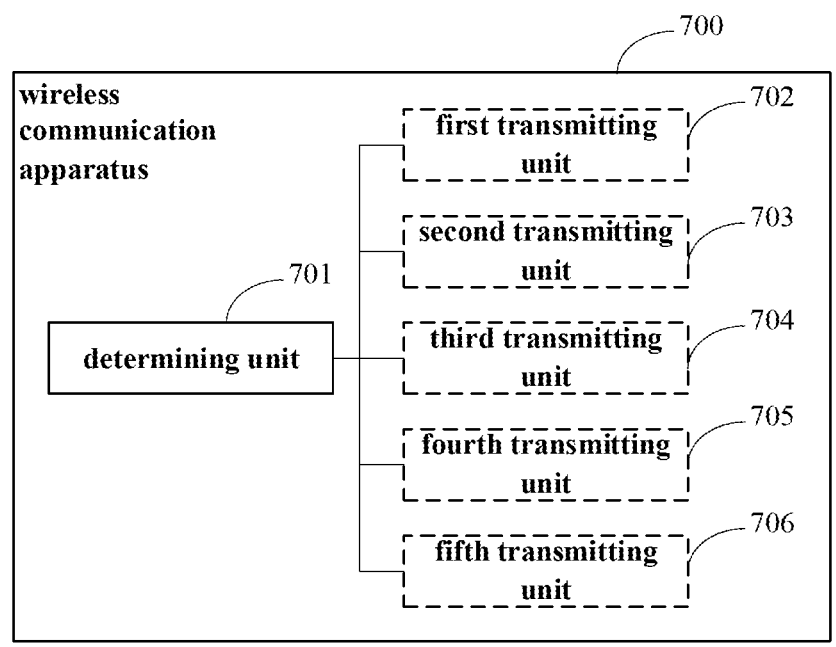
FIG. 7 is a schematic diagram of the wireless communication apparatus of the fifth aspect of the embodiments of this disclosure.

FIG. 7 is a schematic diagram of the wireless communication apparatus of this embodiment. As shown in FIG. 7, the apparatus 700 includes: a determining unit 791 configured to determine a priority of a first uplink signal according to a predefined priority, the first uplink signal being an uplink signal used for beam failure recovery.

In the embodiment of this disclosure, the first uplink signal may be a PUCCH, or a PUSCH, or a physical random access channel (PRACH). A format of the PUCCH is, for example, format 0 or format 1.

In an embodiment, as shown in FIG. 7, the apparatus 700 may further include:
a first transmitting unit 702 configured to transmit the first uplink signal, a resource used for transmission of the first uplink signal overlapping a resource used for transmission of a second uplink signal, and the priority of the first uplink signal being higher than a priority of the second uplink signal.

In an embodiment, as shown in FIG. 7, the apparatus 700 may further include:
a second transmitting unit 703 configured to transmit a second uplink signal, a resource used for transmission of the first uplink signal overlapping a resource used for transmission of the second uplink signal, and the priority of the first uplink signal being lower than a priority of the second uplink signal.

In an embodiment, as shown in FIG. 7, the apparatus 700 may further include:
a third transmitting unit 704 configured to transmit the first uplink signal, a resource used for transmission of the first uplink signal overlapping a resource used for transmission of a second uplink signal, and the priority of the first uplink signal being identical to a priority of the second uplink signal.

In this example, the second uplink signal is one of the following:
a physical uplink control channel (PUCCH) at least carrying scheduling request (SR) information;
a physical uplink control channel (PUCCH) at least carrying channel state information (C S I);
a PUCCH at least carrying hybrid automatic repeat request feedback (HARQ-ACK) information; and
a physical uplink shared channel (PUSCH).

In an embodiment, as shown in FIG. 7, the apparatus 700 may further include:
a fourth transmitting unit 705 configured to transmit a second uplink signal, a resource used for transmission of the first uplink signal overlapping a resource used for transmission of the second uplink signal, and the priority of the first uplink signal being identical to a priority of the second uplink signal.

In this example, the second uplink signal is a PUSCH, and the second uplink signal includes information carried by the first uplink signal.

In an embodiment, as shown in FIG. 7, the apparatus 700 may further include:
a fifth transmitting unit 706 configured to transmit a third uplink signal, information carried by the third uplink signal comprising information carried by the first uplink signal and information carried by a second uplink signal, a resource used for transmission of the first uplink signal overlapping a resource used for transmission of the second uplink signal, and the priority of the first uplink signal being identical to a priority of the second uplink signal.

In this example, the second uplink signal is a PUCCH, the third uplink signal is a PUCCH, and the second uplink signal includes a hybrid automatic repeat request (HARQ) and/or channel state information (CSI).

In the embodiment of this disclosure, the determining unit 701 may be implemented by a processor, and the first to the fifth transmitting units 702-706 may be implemented by transmitters; however, this disclosure is not limited thereto.

According to the apparatus of the embodiment of this disclosure, as described in the embodiment of the first aspect, the terminal equipment is able to process the uplink transmission of identical or different priorities, thereby avoiding ambiguities of behaviors and improving the system efficiency.

Embodiment of the Sixth Aspect

The embodiment of the sixth aspect of this disclosure provides a wireless communication apparatus, configured in a network device. As principles of the apparatus for solving problems are similar to that of the method of the embodiment of the third aspect, reference may be made to the implementations of the method of the embodiment of the third aspect for implementations of this apparatus, with identical parts being not going to be described herein any further.

Figure 8:
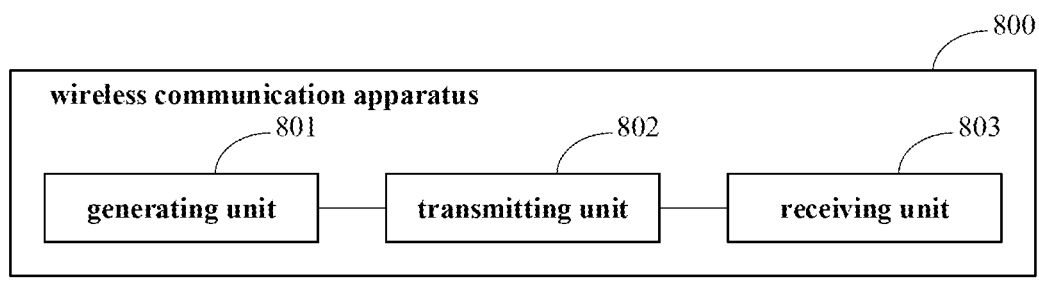
FIG. 8 is a schematic diagram of the wireless communication apparatus of the sixth aspect of the embodiments of this disclosure.

FIG. 8 is a schematic diagram of the wireless communication apparatus 800 of this embodiment. As shown in FIG. 8, the apparatus 800 includes: a generating unit 801 and a transmitting unit 802. The generating unit 801 is configured to generate indication information, and the transmitting unit 802 is configured to transmit an indication information set to a terminal equipment, the terminal equipment determining a priority of a first uplink signal according to the indication information set, the first uplink signal being an uplink signal used for beam failure recovery.

In the embodiment of this disclosure, contents of the indication information set and a manner for determining the priority of the first uplink signal by the terminal equipment have been described in detail in the embodiment of the first aspect, contents of which are incorporated herein, and shall not be described herein any further.

In the embodiment of this disclosure, as shown in FIG. 8, the apparatus 800 may further include a receiving unit 803 configured to receive the first uplink signal, a second uplink signal and/or a third uplink signal, manners for transmitting the first uplink signal, the second uplink signal and the third uplink signal having been described in detail in the embodiment of the first aspect, contents of which are incorporated herein, and shall not be described herein any further.

According to the apparatus of the embodiment of this disclosure, as described in the embodiment of the first aspect, the terminal equipment is able to process the uplink transmission of identical or different priorities, thereby avoiding ambiguities of behaviors and improving the system efficiency.

Embodiment of the Seventh Aspect

The embodiment of the seventh aspect of this disclosure provides a terminal equipment, including the apparatus as described in the embodiment of the fourth or the fifth aspect.

Figure 9:
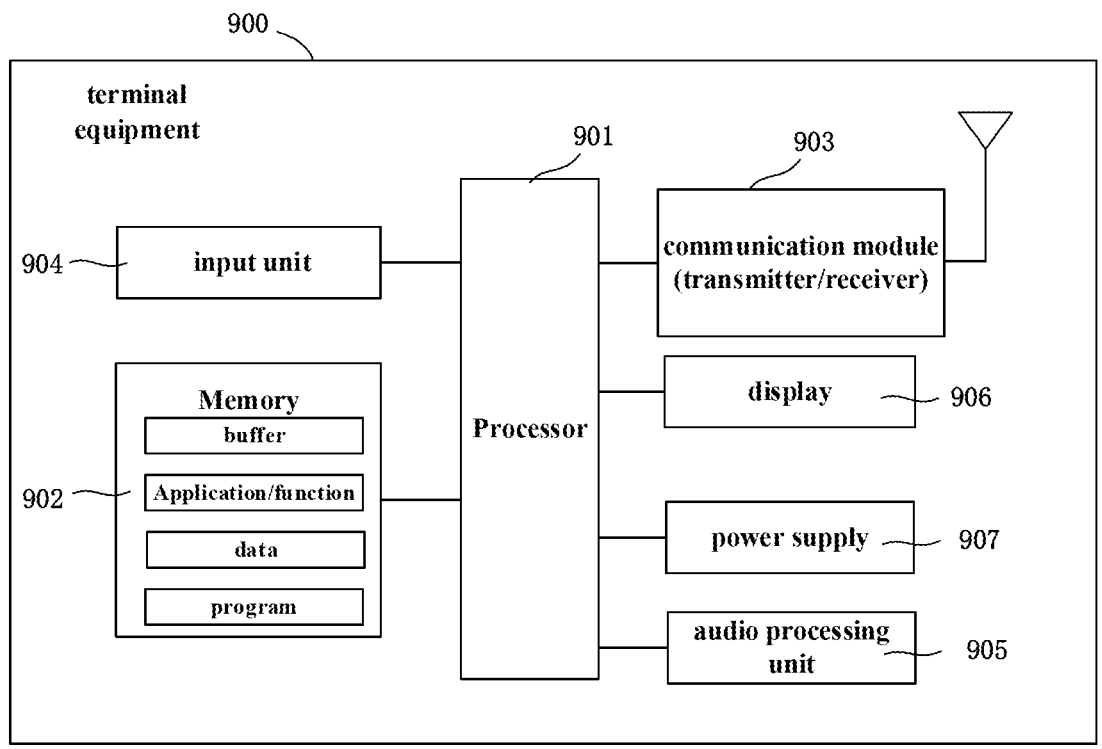
FIG. 9 is a schematic diagram of the terminal equipment of the seventh aspect of the embodiments of this disclosure.

FIG. 9 is a schematic diagram of the terminal equipment of the seventh aspect of the embodiments of this disclosure. As shown in FIG. 9, the terminal equipment 900 may include a central processing unit 901 and a memory 902, the memory 902 being coupled to the central processing unit 901. It should be noted that this figure is illustrative only, and other types of structures may also be used, so as to supplement or replace this structure and achieve a telecommunications function or other functions.

In one embodiment, the functions of the apparatus described in the embodiment of the fourth or the fifth aspect may be integrated into the central processing unit 901, and the central processing unit 901 executes functions of the apparatus described in the embodiment of the fourth or the fifth aspect. The functions of the apparatus described in the embodiment of the fourth or the fifth aspect are incorporated herein, and shall not be described herein any further.

In another embodiment, the apparatus described in the embodiment of the fourth or the fifth aspect and the central processing unit 901 may be configured separately; for example, the apparatus described in the embodiment of the fourth or the fifth aspect may be configured as a chip connected to the central processing unit 901, and the functions of the apparatus described in the embodiment of the fourth or the fifth aspect are executed under control of the central processing unit 901.

As shown in FIG. 9, the terminal equipment 900 may further include a communication module 903, an input unit 904, an audio processing unit 905, a display 906 and a power supply 907. It should be noted that the terminal equipment 900 does not necessarily include all the parts shown in FIG. 9. Furthermore, the terminal equipment 900 may include parts not shown in FIG. 9, and the related art may be referred to.

As shown in FIG. 9, the central processing unit 901 is sometimes referred to as a controller or an operational control, which may include a microprocessor or other processor devices and/or logic devices. The central processing unit 901 receives input and controls operations of components of the terminal equipment 900.

The memory 902 may be, for example, one or more of a buffer memory, a flash memory, a hard drive, a mobile medium, a volatile memory, a nonvolatile memory, or other suitable devices, which may store various data, etc., and furthermore, store programs executing related information. And the central processing unit 901 may execute programs stored in the memory 902, so as to realize information storage or processing, etc. Functions of other parts are similar to those of the related art, which shall not be described herein any further. The parts of the terminal equipment 900 may be realized by specific hardware, firmware, software, or any combination thereof, without departing from the scope of this disclosure.

With the terminal equipment of this embodiment, the terminal equipment is able to process the uplink transmission of identical or different priorities, thereby avoiding ambiguities of behaviors and improving the system efficiency.

Embodiment of the Eighth Aspect

The embodiment of the eighth aspect provides a network device, including the apparatus described in the embodiment of the sixth aspect.

Figure 10:
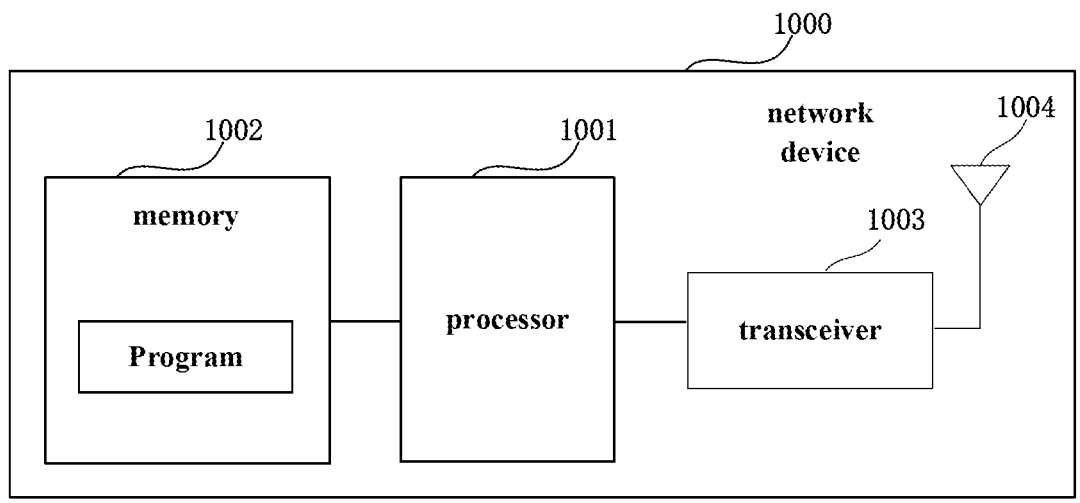
FIG. 10 is a schematic diagram of the network device of the eighth aspect of the embodiments of this disclosure.

FIG. 10 is a schematic diagram of the network device of the embodiment of the eighth aspect. As shown in FIG. 10, the network device 1000 may include a central processing unit (CPU) 1001 and a memory 1002, the memory 1002 being coupled to the central processing unit 1001. The memory 1002 may store various data, and furthermore, it may store a program for data processing, and execute the program under control of the central processing unit 1001, so as to receive various information transmitted by a terminal equipment, and transmit various information to the terminal equipment.

In one embodiment, the functions of the apparatus described in the embodiment of the sixth aspect may be integrated into the central processing unit 1001, and the central processing unit 1001 executes functions of the apparatus described in the embodiment of the sixth aspect. The functions of the apparatus described in the embodiment of the sixth aspect are incorporated herein, and shall not be described herein any further.

In another embodiment, the apparatus described in the embodiment of the sixth aspect and the central processing unit 1001 may be configured separately; for example, the apparatus described in the embodiment of the sixth aspect may be configured as a chip connected to the central processing unit 1001, and the functions of the apparatus described in the embodiment of the sixth aspect are executed under control of the central processing unit 1001.

Furthermore, as shown in FIG. 10, the network device 1000 may include a transceiver 1003, and an antenna 1004, etc. Functions of the above components are similar to those in the related art, and shall not be described herein any further. It should be noted that the network device 1000 does not necessarily include all the parts shown in FIG. 10. Furthermore, the network device 1000 may include parts not shown in FIG. 10, and the related art may be referred to.

With the network device of this embodiment, the terminal equipment is able to process the uplink transmission of identical or different priorities, thereby avoiding ambiguities of behaviors and improving the system efficiency.

Embodiment of the Ninth Aspect

The embodiment of the ninth aspect provides a communication system, including a network device and a terminal equipment. The network device is, for example, the network device 1000 described in the embodiment of the eighth aspect, and the terminal equipment is, for example, the terminal equipment 900 described in the embodiment of the seventh aspect.

In this embodiment, the terminal equipment is, for example, a UE served by a gNB, and may include conventional compositions and functions of a terminal equipment in addition to the functions of the apparatus described in the embodiment of the fourth or the fifth aspect, which are as described in the embodiment of the seventh aspect, and shall not be described herein any further.

In this embodiment, the network device may be, for example, a gNB in NR, and may include conventional compositions and functions of a network device in addition to the functions of the apparatus described in the embodiment of the sixth aspect, which are as described in the embodiment of the eighth aspect, and shall not be described herein any further.

With the communication system of this embodiment, the terminal equipment is able to process the uplink transmission of identical or different priorities, thereby avoiding ambiguities of behaviors and improving the system efficiency.

An embodiment of this disclosure provides a computer readable program, which, when executed in a terminal equipment, will cause a computer to carry out the method described in the embodiment of the first or the second aspect in the terminal equipment.

An embodiment of this disclosure provides a storage medium storing a computer readable program, which will cause a computer to carry out the method described in the embodiment of the first or the second aspect in a terminal equipment.

An embodiment of this disclosure provides a computer readable program, which, when executed in a network device, will cause a computer to carry out the method described in the embodiment of the third aspect in the network device.

An embodiment of this disclosure provides a storage medium storing a computer readable program, which will cause a computer to carry out the method described in the embodiment of the third aspect in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in figures may either correspond to software modules of procedures of a computer program, or correspond to hardware modules. Such software modules may respectively correspond to the steps shown in figures. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

As to the above implementations disclosed in the embodiments, following supplements are further disclosed.

1. A wireless communication apparatus, configured in a terminal equipment, the apparatus including:
   a receiving unit configured to receive an indication information set; and
   a determining unit configured to determine a priority of a first uplink signal according to the indication information set, the first uplink signal being an uplink signal used for beam failure recovery.

2. The apparatus according to supplement 1, wherein the indication information set at least includes first indication information, the first indication information being used to indicate the priority of the first uplink signal, and the determining unit determines the priority of the first uplink signal according to the first indication information.

3. The apparatus according to supplement 1, wherein the indication information set at least includes second indication information, the second indication information being used to indicate a priority of a beam failure recovery (BFR) process and/or a configuration to which the first uplink signal corresponds, and the determining unit determines the priority of the first uplink signal according to the second indication information.

4. The apparatus according to supplement 1, wherein the indication information set at least includes third indication information, the third indication information being used to indicate or determine at least one of the following priorities:
   a priority to which activated SPS PDSCH reception corresponds;
   a priority to which activated CG PUSCH transmission corresponds; and
   a priority associated with downlink control information;
   and the determining unit determines the priority of the first uplink signal according to the third indication information.

5. The apparatus according to supplement 4, wherein the determining unit determines the priority of the first uplink signal according to a highest priority in priorities to which the third indication information corresponds.

6. The apparatus according to supplement 4, wherein the priority to which activated SPS PDSCH reception corresponds refers to a priority to which an SPS configuration corresponds, the activated SPS PDSCH reception corresponding to the SPS configuration.

7. The apparatus according to supplement 4, wherein the priority to which activated CG PUSCH transmission corresponds refers to a priority to which a CG configuration corresponds, the activated CG PUSCH transmission corresponding to the CG configuration.

8. The apparatus according to supplement 4, wherein the priority associated with downlink control information is one of the following priorities:
  a highest priority indicated by a filed of the downlink control information used for indicating priorities;
  a highest priority to which a scrambling ID corresponds, the scrambling ID scrambling CRS to which the downlink control information corresponds;
  a highest priority to which a control resource set (CORESET) corresponds, a search space monitoring the downlink control information corresponding to the CORESET; and
  a priority to which a format of the downlink control information (DCI format) corresponds.

9. The apparatus according to supplement 4 or 8, wherein the downlink control information refers to monitored downlink control information (monitored DCI/PDCCH).

10. The apparatus according to any one of supplements 1-9, wherein the indication information in the indication information set acts on at least one cell corresponding to the first uplink signal.

11. The apparatus according to supplement 10, wherein the cell corresponding to the first uplink signal refers to a cell corresponding to a beam failure recovery (BFR) configuration or process to which the first uplink signal corresponds.

12. The apparatus according to supplement 10 or 11, wherein the cell is an SCell or an SpCell.

13. The apparatus according to any one of supplements 10-12, wherein the cell and the first uplink signal belong to the same cell group.

14. The apparatus according to any one of supplements 1-13, wherein the indication information in the indication information set acts on an activated bandwidth part (BWP).

15. The apparatus according to supplement 1, wherein the apparatus further includes:
  a first transmitting unit configured to transmit the first uplink signal, a resource used for transmission of the first uplink signal overlapping a resource used for transmission of a second uplink signal, and the priority of the first uplink signal being higher than a priority of the second uplink signal.

16. The apparatus according to supplement 1, wherein the apparatus further includes:
  a second transmitting unit configured to transmit a second uplink signal, a resource used for transmission of the first uplink signal overlapping a resource used for transmission of the second uplink signal, and the priority of the first uplink signal being lower than a priority of the second uplink signal.

17. The apparatus according to supplement 1, wherein the apparatus further includes:
  a third transmitting unit configured to transmit the first uplink signal, a resource used for transmission of the first uplink signal overlapping a resource used for transmission of the second uplink signal, and the priority of the first uplink signal being identical to a priority of the second uplink signal.

18. The apparatus according to supplement 17, wherein the second uplink signal is one of the following:
  a physical uplink control channel (PUCCH) at least carrying scheduling request (SR) information,
  a physical uplink control channel (PUCCH) at least carrying channel state information (CSI);
  a PUCCH at least carrying hybrid automatic repeat request feedback (HARQ-ACK) information; and
  a physical uplink shared channel (PUSCH).

19. The apparatus according to supplement 1, wherein the apparatus further includes: a fourth transmitting unit configured to transmit a second uplink signal, a resource used for transmission of the first uplink signal overlapping a resource used for transmission of the second uplink signal, and the priority of the first uplink signal being identical to a priority of the second uplink signal.

20. The apparatus according to supplement 19, wherein the second uplink signal is a PUSCH, and the second uplink signal includes information carried by the first uplink signal.

21. The apparatus according to supplement 1, wherein the apparatus further includes:
  a fifth transmitting unit configured to transmit a third uplink signal, information carried by the third uplink signal including information carried by the first uplink signal and information carried by a second uplink signal, a resource used for transmission of the first uplink signal overlapping a resource used for transmission of the second uplink signal, and the priority of the first uplink signal being identical to a priority of the second uplink signal.

22. The apparatus according to supplement 21, wherein the second uplink signal is a PUCCH, the third uplink signal is a PUCCH, and the second uplink signal includes a hybrid automatic repeat request (HARQ) and/or channel state information (CSI).

23. The apparatus according to any one of supplements 1-22, wherein the first uplink signal is a PUCCH or a PUSCH or a physical random access channel (PRACH).

24. The apparatus according to supplement 23, wherein a format of the PUCCH is format 0 or format 1.

1A. A wireless communication apparatus, configured in a terminal equipment, the apparatus including:
  a determining unit configured to determine a priority of a first uplink signal according to a predefined priority, the first uplink signal being an uplink signal used for beam failure recovery.

2A. The apparatus according to supplement 1A, wherein the apparatus further includes:
  a first transmitting unit configured to transmit the first uplink signal, a resource used for transmission of the first uplink signal overlapping a resource used for transmission of a second uplink signal, and the priority of the first uplink signal being higher than a priority of the second uplink signal.

3A. The apparatus according to supplement 1A, wherein the apparatus further includes:
  a second transmitting unit configured to transmit a second uplink signal, a resource used for transmission of the first uplink signal overlapping a resource used for transmission of the second uplink signal, and the priority of the first uplink signal being lower than a priority of the second uplink signal.

4A. The apparatus according to supplement 1A, wherein the apparatus further includes:
  a third transmitting unit configured to transmit the first uplink signal, a resource used for transmission of the first uplink signal overlapping a resource used for transmission of a second uplink signal, and the priority of the first uplink signal being identical to a priority of the second uplink signal.

5A. The apparatus according to supplement 4A, wherein the second uplink signal is one of the following:
   a physical uplink control channel (PUCCH) at least carrying scheduling request (SR) information,
   a physical uplink control channel (PUCCH) at least carrying channel state information (CSI);
   a PUCCH at least carrying hybrid automatic repeat request feedback (HARQ-ACK) information; and
   a physical uplink shared channel (PUSCH).

6A. The apparatus according to supplement 1A, wherein the apparatus further includes:
   a fourth transmitting unit configured to transmit a second uplink signal, a resource used for transmission of the first uplink signal overlapping a resource used for transmission of the second uplink signal, and the priority of the first uplink signal being identical to a priority of the second uplink signal.

7A. The apparatus according to supplement 6A, wherein the second uplink signal is a PUSCH, and the second uplink signal includes information carried by the first uplink signal.

8A. The apparatus according to supplement 1A, wherein the apparatus further includes:
   a fifth transmitting unit configured to transmit a third uplink signal, information carried by the third uplink signal including information carried by the first uplink signal and information carried by a second uplink signal, a resource used for transmission of the first uplink signal overlapping a resource used for transmission of the second uplink signal, and the priority of the first uplink signal being identical to a priority of the second uplink signal.

9A. The apparatus according to supplement 8A, wherein the second uplink signal is a PUCCH, the third uplink signal is a PUCCH, and the second uplink signal includes a hybrid automatic repeat request (HARQ) and/or channel state information (CSI).

10A. The apparatus according to any one of supplements 1A-9A, wherein the first uplink signal is a PUCCH or a PUSCH or a physical random access channel (PRACH).

11A. The apparatus according to supplement 10A, wherein a format of the PUCCH is format 0 or format 1.

What is claimed is:

1. A wireless communication apparatus, configured in a terminal equipment, the apparatus comprising:
   a receiver configured to receive an indication information set;
   processor circuitry configured to determine a priority of a first uplink signal according to the indication information set, the first uplink signal being an uplink signal used in performing beam failure recovery; and
   a transmitter configured to transmit a third uplink signal, wherein information carried by the third uplink signal comprises information carried by the first uplink signal and information carried by a second uplink signal, and wherein a resource used in transmitting the first uplink signal overlaps a resource used in transmitting the second uplink signal, and the priority of the first uplink signal is identical to a priority of the second uplink signal.

2. The apparatus according to claim 1, wherein the indication information set at least comprises indication information, the indication information indicating the priority of the first uplink signal, and the processor circuitry determines the priority of the first uplink signal according to the indication information.

3. The apparatus according to claim 1, wherein the indication information set at least comprises indication information, the indication information indicating a priority of a beam failure recovery process and/or a configuration to which the first uplink signal corresponds, and the processor circuitry determines the priority of the first uplink signal according to the indication information.

4. The apparatus according to claim 1, wherein the indication information set at least comprises indication information, the indication information indicating, or being used in determining at least one of the following priorities:
   a priority to which activated Semi-Persistent Scheduling Physical Downlink Shared Channel (SPS PDSCH) reception corresponds;
   a priority to which activated Configured Grant Physical Uplink Shared Channel (CG PUSCH) transmission corresponds; and
   a priority associated with downlink control information;
   and the processor circuitry determines the priority of the first uplink signal according to the indication information.

5. The apparatus according to claim 4, wherein the processor circuitry determines the priority of the first uplink signal according to a highest priority in priorities to which the indication information corresponds.

6. The apparatus according to claim 4, wherein the priority to which activated SPS PDSCH reception corresponds refers to a priority to which an SPS configuration corresponds, the activated SPS PDSCH reception corresponding to the SPS configuration.

7. The apparatus according to claim 4, wherein the priority to which activated CG PUSCH transmission corresponds refers to a priority to which a CG configuration corresponds, the activated CG PUSCH transmission corresponding to the CG configuration.

8. The apparatus according to claim 4, wherein the priority associated with downlink control information is one of the following priorities:
   a highest priority indicated by a field of the downlink control information indicating priorities;
   a highest priority to which a scrambling ID corresponds, the scrambling ID scrambling CRS to which the downlink control information corresponds;
   a highest priority to which a control resource set corresponds, a search space monitoring the downlink control information corresponding to the control resource set; and
   a priority to which a format of the downlink control information corresponds.

9. The apparatus according to claim 1, wherein indication information in the indication information set is applied to at least one cell corresponding to the first uplink signal.

10. The apparatus according to claim 1, wherein:
    the transmitter is further configured to transmit the first uplink signal, wherein the resource used in transmitting the first uplink signal overlaps the resource used in transmitting the second uplink signal, and the priority of the first uplink signal is identical to the priority of the second uplink signal.

11. The apparatus according to claim 1, wherein:
    the transmitter is further configured to transmit the second uplink signal, wherein the resource used in transmitting the first uplink signal overlaps the resource used in transmitting the second uplink signal, and the priority of the first uplink signal is identical to the priority of the second uplink signal.

\* \* \* \* \*